June 9, 1964

I. W. HYND 3,136,922

ELECTRICAL CONTROL SYSTEMS

Filed Jan. 8, 1962

FIG. 1

FIG. 2

INVENTOR

*Irvin W. Hynd,*

BY *Watson, Cole, Grindle & Watson*

ATTORNEYS

United States Patent Office 3,136,922
Patented June 9, 1964

3,136,922
ELECTRICAL CONTROL SYSTEMS
Irvin W. Hynd, Box 93, Midland, Tex.
Filed Jan. 8, 1962, Ser. No. 164,841
3 Claims. (Cl. 317—13)

This invention relates to an electrical control system and, more particularly, to an electrical control system which is energized by the supply line current to control the supply line load.

Priorly, numerous forms of electrical control systems have been employed for the protection of electrical loads. For example, certain of these systems are utilized with three-phase loads and employ at least one, and preferably two, relays connected in each of the phases of the supply system. Alternate ones of the coils are connected to each other with a separate relay winding controlling a main relay having armatures serially connected in each of the three phases for disconnecting the load in response to the de-energization of any two of the pairs of serially connected windings.

These prior art devices, however, are expensive to construct and, additionally, exhibit defects of both mechanical and electrical nature.

Accordingly, it is an object of this invention to provide an improved three-phase control system.

It is another object of this invention to provide a three-phase control system which is constructed with a minimum of parts and is therefore economical.

It is another object of this invention to provide an electrical control system having an electromechanical operation in both the connect and disconnect operations such that the device is completely electromagnetic and therefore highly reliable.

Briefly, in accordance with aspects of this invention, an electrical control system is provided which utilizes the current of the controlled device to open the control circuit electromagnetically in such a manner that it will not reclose except by closing the reset circuit. In one illustrative embodiment of this invention, a system is provided in which the controlled device has sufficient normal holding, or running, current to operate a control relay. The system includes a second relay which has a pair of oppositely wound windings on its core and a single normally closed armature contact operatively associated with the core. A control switch is serially connected between the control relay and one of the supply lines. The circuit of the control relay winding includes the normally closed contact of the second relay which completes the return circuit to one of the supply lines. Connected in series with this circuit is a normally closed condition responsive switch such as a thermostat which may be imbedded in the controlled device. When the circuit of the control relay is closed by means of the control switch, contacts associated with each of the supply lines are closed, thereby completing the circuit to the controlled device. If the condition responsive switch opens due to excessive heating of the controlled device, the circuit through one winding of the two-winding relay is energized causing the normally closed associated contact to be opened. When this contact is open, the winding of the control device relay is opened and the main contacts in each of the supply lines are opened, thereby de-energizing the controlled device. When the controlled device cools sufficiently for the thermostat switch to reclose, the device will nevertheless fail to respond until the reset pushbutton is operated, thereby completing the circuit of the second winding of the two-winding relay which closes its associated contact completing the path for the main control relay.

In another illustrative embodiment of this invention, a transformer is operatively associated with the relay having two windings on its core such that the transformer steps up the control current applied to the winding of the two-winding relay employed to open the associated contact of this relay. Accordingly, the system will operate to control a load in which the running current is normally insufficient to operate the two-winding relay.

These and various other objects and features of this invention will be more clearly understood from a reading of the detailed description of the invention in conjunction with the drawing in which:

FIGURE 1 is a schematic representation of one illustrative embodiment of this invention; and FIGURE 2 is a schematic representation of another illustrative embodiment of this invention.

Referring now to FIGURE 1, there is depicted a control system for a three-phase device represented as motor 10 which is supplied by three phase lines 12, 13, and 14. The control system includes a magnetic motor starter, or control relay, 16 having armatures 17, 18, and 19 connected for controlling the circuit from lines 12, 13, and 14 to the motor 10. The control system includes a control switch 22 connected to line 12 and to the winding of relay 16. The other side of the winding of relay 16 is connected through one or more serially connected thermostat switches 26 which may be imbedded in the device to be controlled. In this instance the thermostat, or thermostats, as the case may be, may be imbedded in the windings of the motor 10. Serially connected between the thermostat 26 and line 14 are a fuse 28 and the normally closed armature 30 of relay 32. Thus, at any time the control system is in the condition indicated in FIGURE 1, the motor starter, or control relay 16, may be energized by closing the control switch 22, thereby energizing the winding of relay 16 and moving armatures 17, 18, and 19 to their closed, or dotted line, position.

The relay 32 has a pair of oppositely wound disconnect and connect windings 33 and 35, respectively. When disconnect winding 33 is energized, armature 30 is repelled to its open circuit position where it remains through a mechanical latching arrangement (not shown) until the winding 35 is energized at which time the armature is attracted to its closed position.

For the purpose of explaining the operation of this system, assume that the system is in the condition shown in FIGURE 1 and it is desired to start the motor 10. The control switch 22 is closed by manual or automatic means, thus completing the energizing circuit of relay 16 through thermostat 26, fuse 28, and armature 30. When relay 16 is energized, armatures 17, 18, and 19 are attracted to their dotted line, or closed, position, thus completing the path between lines 12, 13, and 14 to the motor 10. The system will remain in this condition and the motor will continue to run until, through some fault within the motor, the thermostat switch 26 became overheated thereby opening its contacts. Current now flows from the winding of relay 16 through the disconnect winding 33 of relay 32, fuse 28, and armature 30. When coil 33 is energized it repels the armature 30 causing it to move to its open circuit condition where it is mechanically retained through convenient means (not shown). Thus the energized circuit of relay 16 is opened and the armatures 17, 18, and 19 will be moved to their open circuit position, shown in solid lines, by convenient means such as a spring 36. Since the armature 30 is mechanically retained in its open circuit position by suitable means (not shown) the control system cannot now be energized by closing the control switch 22 even after the thermostatic switch 26 returns to its closed circuit position. The control system may be reset, however, by pushing reset button 38 after the switch 22 is closed. Actuating the switches 22 and 38 energizes the winding of relay 16 and winding 35 of relay 32. When winding 35 is energized, it attracts armature 30 to its closed circuit position overcoming the mechanical latching arrangement previously mentioned, but not shown, and the relay 16 attracts armatures 17, 18, and 19 to their closed circuit position thereby energizing the motor 10.

Thus it will be apparent that this control system requires a minimum of parts while providing positive lock-in and lock-out and all the other control features required for satisfactory operation of the load, in this instance, a three-phase motor 10. This system has proved highly satisfactory for unattended operation of three-phase electric motors and would, of course, be equally satisfactory for the operation of other types of loads. In fact, the control system would operate equally well on single phase systems since it is only necessary to connect the control system between two lines such as lines 12 and 14 of FIGURE 1.

Referring now to FIGURE 2, there is depicted, in schematic form, another illustrative embodiment of this invention in which identical parts are designated with the identical reference numerals. In this system it is assumed that the motor 10, when operating, draws insufficient current to operate relay 32. Under these circumstances, a transformer 40 is employed with its primary winding 41 connected in parallel with thermostatic switch 36 and fuse 28. The secondary winding 43 of transformer 40 has a stepdown ratio with respect to the number of turns in the primary winding 41 and, accordingly, when the thermostat switch 26 opens and current flows in the primary winding 41, a greater current flows in the secondary winding 43 thus energizing the winding 33 of relay 32 with sufficient current to repel the armature 30 to its open circuit position. Armature 30 is mechanically latched, or held, until the winding 35 is energized by the reclosing of thermostat switch 26 and switches 22 and 38. The operation of the embodiment of FIGURE 2 is otherwise identical to that of FIGURE 1.

While I have shown and described two illustrative embodiments of this invention, it is understood that the concepts thereof may be applied to other embodiments without departing from the spirit and scope of this invention.

What is claimed is:
1. An electrical control system for selectively connecting and disconnecting a load relative to at least two lines of a supply source comprising a control relay having a winding connected to one of said supply lines and a plurality of armatures, one serially connected between each of said supply lines and said load, switch means connected between said control relay winding and said one line, a second relay having a pair of oppositely wound windings connected in series to said first relay winding and a normally closed armature operatively associated therewith, one of said windings, when energized, acting to repel said armature to its open circuit condition, the other of said windings, when energized, acting to attract the armature to its closed circuit condition, a first switch means connected to the windings of said first relay, a transformer having a primary and a secondary winding, said primary winding being connected to said first switch means and to one of said supply lines, a condition responsive switch connected in parallel with said primary winding, said secondary winding being connected in parallel with said disconnect winding of said second relay, normally open reset switch means connected in series between said connect winding and one of said supply lines, the armature of said second relay being connected in parallel with the series circuit defined by said connect winding and said second switch means.

2. A control system according to claim 1 wherein said condition responsive switch is a thermostatic switch operatively associated with said load.

3. The system according to claim 2 wherein said reset switch means is a normally open pushbutton switch and wherein said system further includes a fuse serially connected with said condition responsive switch to define a circuit which is connected in parallel with said primary winding.

References Cited in the file of this patent
UNITED STATES PATENTS
2,056,040     Dozler _____ Sept. 26, 1936